US011064132B2

(12) United States Patent
Fruchtman et al.

(10) Patent No.: US 11,064,132 B2
(45) Date of Patent: Jul. 13, 2021

(54) IMAGE CAPTURE WITH ANTI-FLICKER SYNCHRONIZATION

(71) Applicant: SAMSUNG ELECTRONICS CO., LTD., Suwon-si (KR)

(72) Inventors: Amir Fruchtman, Holon (IL); Eran Doron, Herzliya (IL); Ariel Orfaig, Kfar Ben-Nunn (IL); Oded Monzon, Modiin (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/396,886

(22) Filed: Apr. 29, 2019

(65) Prior Publication Data

US 2020/0344398 A1    Oct. 29, 2020

(51) Int. Cl.
*H04N 5/235* (2006.01)
*H04N 5/355* (2011.01)
*H04N 5/232* (2006.01)

(52) U.S. Cl.
CPC ......... *H04N 5/2354* (2013.01); *H04N 5/2353* (2013.01); *H04N 5/2357* (2013.01); *H04N 5/23229* (2013.01); *H04N 5/355* (2013.01)

(58) Field of Classification Search
None
See application file for complete search history.

(56) References Cited

U.S. PATENT DOCUMENTS

| | | | |
|---|---|---|---|
| 9,609,232 B2 | 3/2017 | Nakagawara | |
| 2016/0044223 A1* | 2/2016 | Harada | H04N 5/2353 348/207.11 |
| 2016/0073001 A1* | 3/2016 | Nakagawara | H04N 5/2357 348/226.1 |
| 2018/0324344 A1* | 11/2018 | Kinoshita | H04N 5/2355 |

* cited by examiner

*Primary Examiner* — Mark T Monk
(74) *Attorney, Agent, or Firm* — F. Chau & Associates, LLC

(57) ABSTRACT

A camera may include an image sensor configured to capture and measure light of a scene to be imaged. Control circuitry may be configured to control the image sensor to measure instances of the light captured in main exposure windows interspersed with test exposure windows. Timing of the main exposure windows may be adjusted based on luminance levels captured during the test exposure windows, for synchronization with a flickering waveform of the light.

19 Claims, 13 Drawing Sheets

IMAGE CAPTURE WITH ANTI-FLICKER SYNCHRONIZATION

TECHNICAL FIELD

This disclosure relates generally to camera technology and more particularly to image capture with minimal artifacts due to a flickering light source.

DISCUSSION OF THE RELATED ART

AC-powered light sources (e.g. fluorescent or incandescent lamps) emit luminance in periodic pulses with a luminance frequency approximately twice that of the supply power's frequency. For instance, according to national standards the power supply frequency is either 50 Hz or 60 Hz, yielding a flicker at 100 Hz or 120 Hz, respectively. The flicker frequency, however, may be imprecise and may drift with time.

If the exposure period is shorter than the flicker period, artifacts may occur due to flickering. In the case of video (continuous recording of multiple frames) flickering artifacts can result when successive frames capture a different respective fraction of the luminance pulses, depending on the sampled frame's phase. The flickering light source causes average luminance in the captured image to undesirably vary from frame to frame. Artifacts can also result when capturing a still image with a rolling shutter camera, since a different fraction of the luminance pulses is captured on the same frame.

When detecting the presence of a flicker, a common solution has been to set the exposure time to be an integer multiple of the flicker period. However, for scenes with fast-moving objects, a shorter exposure time is desirable. Another scheme deploys an auxiliary image sensor to continuously monitor the flicker phase, and synchronizes capture of a main image sensor with the flicker. However, this approach both adds complexity to the camera and is power intensive.

SUMMARY

In an illustrative embodiment of the inventive concept, a camera includes an image sensor configured to capture and measure light of a scene to be imaged. Control circuitry may be configured to control the image sensor to measure instances of the light captured in main exposure windows interspersed with test exposure windows. Timing of the main exposure windows may be adjusted based on luminance levels captured during the test exposure windows, for synchronization with a flickering waveform of the light.

The control circuitry may be configured to adjust the timing of the main exposure windows for alignment with peaks of the flickering waveform.

In an embodiment of the inventive concept, a method for image capture in an environment of a flickering light source includes: (i) repetitively measuring instances of light energy of a scene captured with an image sensor in main exposure windows interspersed with test exposure windows; and (ii) based on measured luminance levels of the light energy captured during the test exposure windows, adjusting a timing of the main exposure windows for synchronization with a flicker frequency of the light source.

Another method for image capture in an environment of a flickering light source according to an embodiment may include: (i) repetitively measuring N instances of light energy of a scene captured with an image sensor in sets of N test windows, respectively, where N is at least two; (ii) for each set of N test windows, determining a difference in luminance among the N instances of captured light energy; and (iii) based on the difference, adjusting a timing at which the image sensor captures at least one main frame of the scene in at least one main exposure window, the timing being adjusted relative to a flicker cycle phase of the light source.

In various embodiments, the light may be captured and measured using either a global shutter or rolling shutter mechanism.

In various embodiments, sets of test frames may be derived from luminance measurements during two or more non-overlapping test windows. In other embodiments, test frames are derived from measurements during two or more overlapping test windows of a high dynamic range (HDR) image sensor.

BRIEF DESCRIPTION OF THE DRAWINGS

The above and other aspects and features of the inventive concept will become more apparent from the following detailed description, taken in conjunction with the accompanying drawings in which like reference numerals indicate like elements or features, wherein.

DETAILED DESCRIPTION OF EMBODIMENTS

Figure 1:
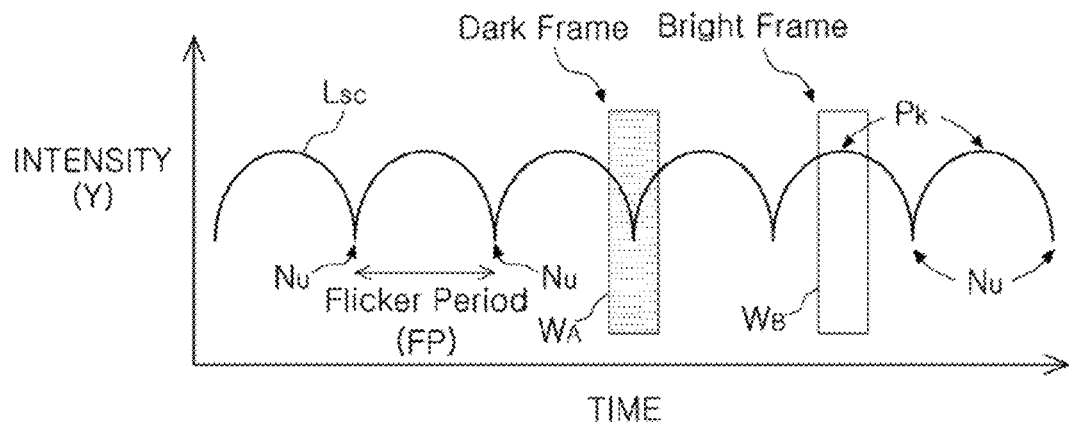
FIG. 1 is a graph illustrating how two successive frames may be captured by a camera that lacks a mechanism to prevent flicker-based artifacts.

The following description, with reference to the accompanying drawings, is provided to assist in a comprehensive understanding of certain exemplary embodiments of the inventive concept disclosed herein for illustrative purposes. The description includes various specific details to assist a person of ordinary skill the art with understanding the inventive concept, but these details are to be regarded as merely illustrative. For the purposes of simplicity and clarity, descriptions of well-known functions and constructions may be omitted when their inclusion may obscure appreciation of the inventive concept by a person of ordinary skill in the art. FIG. 1 is a graph illustrating how two successive frames may be captured by a camera that lacks a mechanism to prevent flicker-based artifacts. A flickering light source may illuminate a scene with an intensity waveform $L_{SC}$ that varies periodically between peaks $P_K$ and nulls Nu. (Herein, the terms intensity and luminance (Y) may be used interchangeably.) The waveform $L_{SC}$ may resemble a rectified sine wave. As illustrated, a flicker period FP may be defined as a period between successive nulls Nu.

For short exposures of less than one flicker period FP, a relatively dark frame will be captured during an exposure window $W_A$ centered about a null Nu. Conversely, a relatively bright frame will be captured during an exposure window $W_B$ centered about a peak $P_K$. Depending on the flicker period FP and intensity difference between the peaks and nulls, video composed of periodic frames taken in windows $W_A$, $W_B$ . . . may have flicker noticeable to the viewer as a defect. Thus, it is desirable to synchronize frame capture with the flicker period FP (=1/flicker frequency $f_{FL}$) so that frames are only captured during exposure windows like $W_B$ centered about peaks of the ambient light source's flicker cycle.

Figure 2:
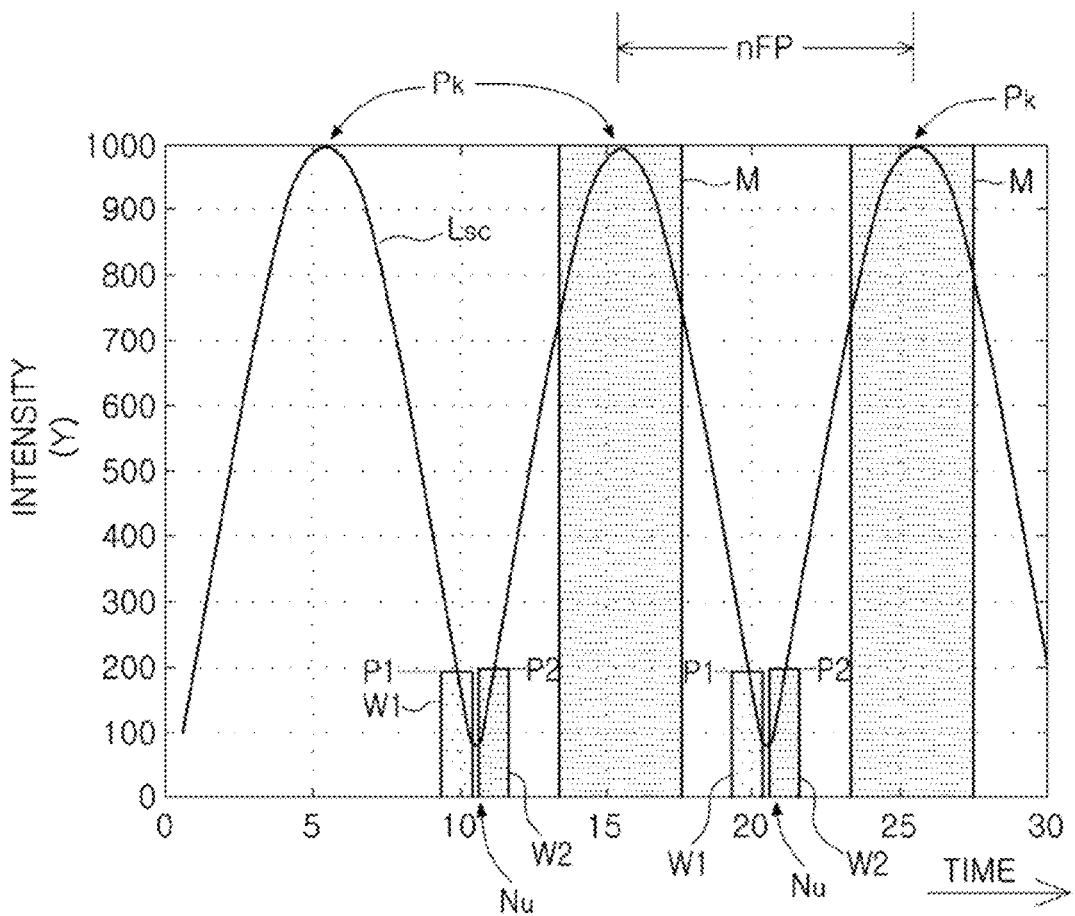
FIG. 2 is a graph showing examples of exposure windows that may be established to capture images in a camera according to the present disclosure.

FIG. 2 is a graph showing examples of exposure windows that may be established to capture images in a camera according to the present disclosure. In an environment in which a light source illuminates a scene with a flickering intensity waveform $L_{SC}$, a camera according to the present disclosure may detect the nulls, peaks and frequency of the flickering light source, and set the timing of main exposure windows M to be aligned with peaks $P_K$ of the flicker waveform $L_{SC}$. The timing of windows M may be established by periodically capturing pairs of test frames during test exposure windows W1, W2. The test frames may be used to track the flicker frequency and phase of the ambient light waveform $L_{SC}$. In other examples, periodic sets of at least three test frames may be used.

The example shown in FIG. 2 is one depicting a steady state condition in which separation intervals between respective pairs of windows W1, W2 are approximately aligned with nulls Nu of the light waveform $L_{SC}$. In the steady state condition, the main exposure windows M, which are aligned with peaks $P_K$ of the flickering light, may be used to capture video without any flicker artifacts. The video may be captured using an image sensor employing a global shutter in which an entire frame of the scene is captured simultaneously. (A rolling shutter example, which also reduces flickering artifacts but in a different manner, is described later.)

To arrive at the steady state condition, an average luminance p1 for a frame captured during window W1 may be compared to an average luminance p2 captured during a succeeding frame W2 of a test frame pair. If the value of |p1−p2| is approximately zero, i.e., p1≈p2, the separation intervals between test windows W1, W2 may be assumed to be aligned with the nulls Nu. If the value of |p1−p2| is relatively high, this is an indication that the test windows W1, W2 are misaligned with the nulls Nu. An adjustment may then made to delay or advance the timing of the next set of test windows W1, W2 from a time point from which they would otherwise begin. In other words, the instantaneous frame rate at which the test frames are captured, is adjusted. When p1≈p2 and test windows W1, W2 are thereby assumed to be aligned with the nulls Nu, then main exposure windows M may be offset one half of a flicker cycle away for alignment with the flicker peaks $P_K$. Note that a period between main exposure windows M may be generally nFP, where n=1 in the example of FIG. 2. In other cases where it is desired to capture main frames less frequently, n may be two or higher.

Figure 3:
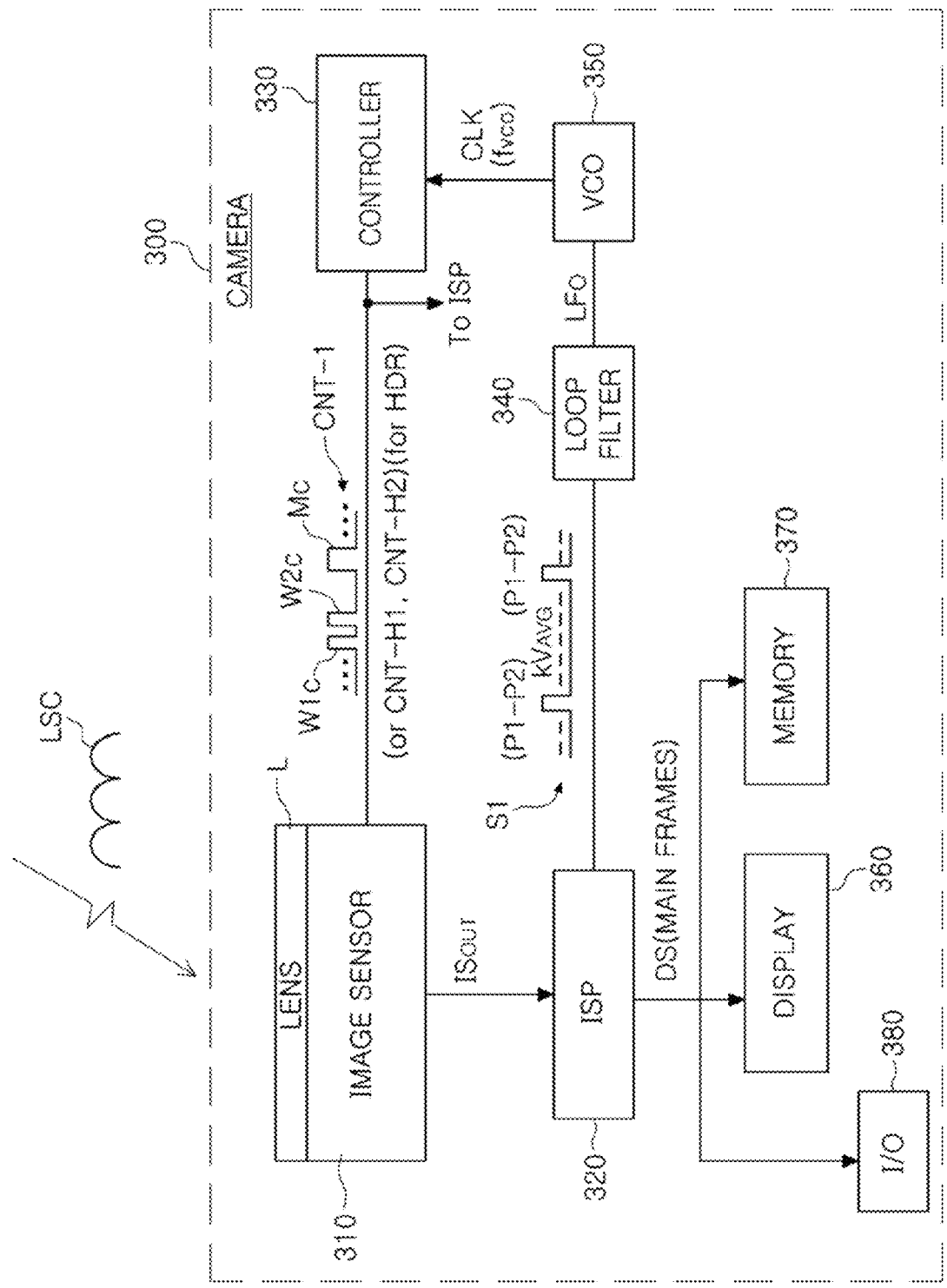
FIG. 3 is a block diagram illustrating elements of an example camera according to an embodiment of the inventive concept.

FIG. 3 is a block diagram illustrating elements of an example camera, 300, according to an embodiment of the inventive concept. Camera 300 includes an image sensor 310, a lens L, an image signal processor (ISP) 320, a shutter controller 330, a loop filter 340, a voltage controlled oscillator (VCO) 350, a display 360, memory 370 and an input/output (I/O) interface 380. Camera 300 may be a stand-alone camera or may be part of another apparatus, such as a smart phone or a vehicle.

Image sensor 310 may receive (capture) incident light $L_{SC}$ with a flickering waveform from a scene through lens L, and measure instances of the light captured in exposure windows. Shutter controller 330 may control image sensor 310 to measure instances of the light captured in main exposure windows interspersed with test exposure windows. The instances of measured light may be received during exposure windows controlled by a control signal CNT-1 generated by shutter controller 330. (In another embodiment discussed later, image sensor 310 has high dynamic range (HDR) capability. In this case, control signals CNT-H1, CNT-H2, etc. may be substituted for control signal CNT-1.) For example, image sensor 310 may have an electronic or mechanical shutter by which light energy is passed and stored by pixels of image sensor 310 when CNT-1 is at a first logic level (e.g. logic high) and is not stored by the pixels when CNT-1 is at an opposite logic level. Control signal CNT-1 may include periodic pairs of control pulses W1c, W2c that "open the shutter" in corresponding test exposure windows W1, W2.

For image capture and measurement with an electronic shutter mechanism of image sensor 310, as opposed to a mechanical shutter, the electronic shutter equivalently "opens and closes" the shutter to control exposure by turning the imaging sensor on and off. Herein, the phrases "open the shutter", "close the shutter" or the like are intended to apply to either mechanical or electronic shutter mechanisms. With an electronic shutter, technically there may be no actual opening and closing of a shutter. Instead, exposure window control signals cause values of the pixels to be reset, and read after a certain time, but the light may always pass from the scene towards the pixels of image sensor 310. The light may fill the pixel capacitors even during times outside the exposure windows. Thus, exposure window control signals CNT-1, etc. may serve to control resetting of pixel values and read-out of the pixel values after a certain time, rather than cause physical opening and closing of a shutter.

Control signal CNT-1 may also include periodic control pulses Mc interspersed with the control pulses W1c, W2c, that "open the shutter" in main exposure windows M. Controller 330 may also communicate directly with ISP 320 to facilitate ISP 320's operations of reading out test frames and main frames, e.g., by providing control signal CNT-1 (or CNT-H1, CNT-H2, etc.) directly to ISP 320 to facilitate synchronization and/or differentiation between the test frames and the main frames.

The frequency at which the pairs of control pulses W1c, W2c are provided may be set according to a frequency $f_{VCO}$ of a clock signal CLK output by VCO 350. All of VCO 350, shutter controller 330, image sensor 310, ISP 320 and loop filter 340 may collectively form a phase locked loop (PLL) by which frequency $f_{VCO}$ is continually adjusted to track the flicker frequency of the light $L_{SC}$. Loop filter 340 and VCO 350 may be implemented digitally, as in a digital phase locked loop. Alternatively, they may be embodied as analog circuitry. In the case of the digital PLL, loop filter 340 may be a digital loop filter, and VCO 350 may be a digital VCO that synthesizes an output clock at frequency $f_{VCO}$. The digital loop filter and digital VCO may be embodied as processing circuitry (e.g., a portion of the processing circuitry of ISP 320, although shown separately in FIG. 3) executing instructions from a memory (e.g., a portion of memory 370).

Following each exposure window W1, W2 and M, ISP 320 may read out data $IS_{OUT}$ from image sensor 310 to obtain a frame of luminance data collected during the corresponding exposure window (exposure period, interchangeably). A main frame of data DS obtained during exposure window M may be obtained and output to display 360, memory 370 and/or I/O 380 in a conventional manner (I/O 380 may be used for outputting frames to an external device). Luminance data from the test frames obtained during windows W1 and W2, however, are not output with data DS. Rather, the test frame data are used to generate a "difference signal" S1 for tracking the flicker frequency and adjusting the timing of subsequent exposure windows.

It is noted here that shutter controller 330 may be a hardware control circuit comprising a programmable processor that runs a routine for generating control signal CNT-1 (or control signals CNT-H1, CNT-H2, etc.) by executing program instructions from an internal or external memory (e.g. memory 370). (Shutter controller 330 may be interchangeably called a shutter control circuit, circuitry, or the like.) Likewise, ISP 320 may comprise a programmable processor that reads instructions from a memory (e.g., an internal memory or memory 370) to execute the associated operations described herein. ISP 320, shutter controller 330, loop filter 340 and VCO 350 may be collectively referred to herein as "control circuitry". Shutter controller 330 and ISP 320 may, in practice, be parts of a single integrated circuit. Shutter controller 330 may be part of ISP 320 in some embodiments. Further, as noted above, loop filter 340 and VCO 350 may also be part of ISP 320 in a digital PLL implementation.

Figure 4:
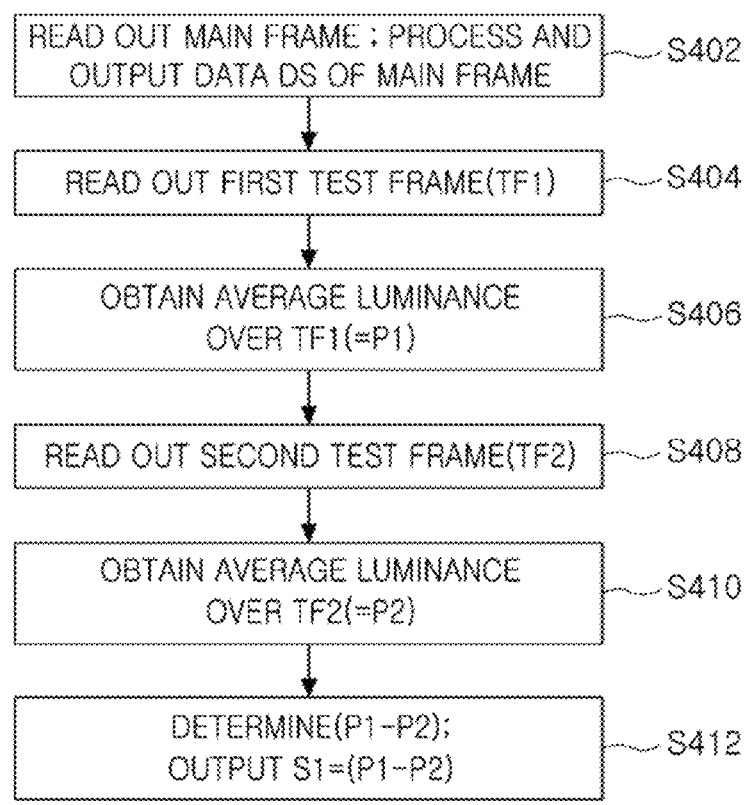
FIG. 4 is a flow diagram illustrating an example process by which an image signal processor may read data from an image sensor of a camera and generate output signals according to an embodiment.
Figure 5:
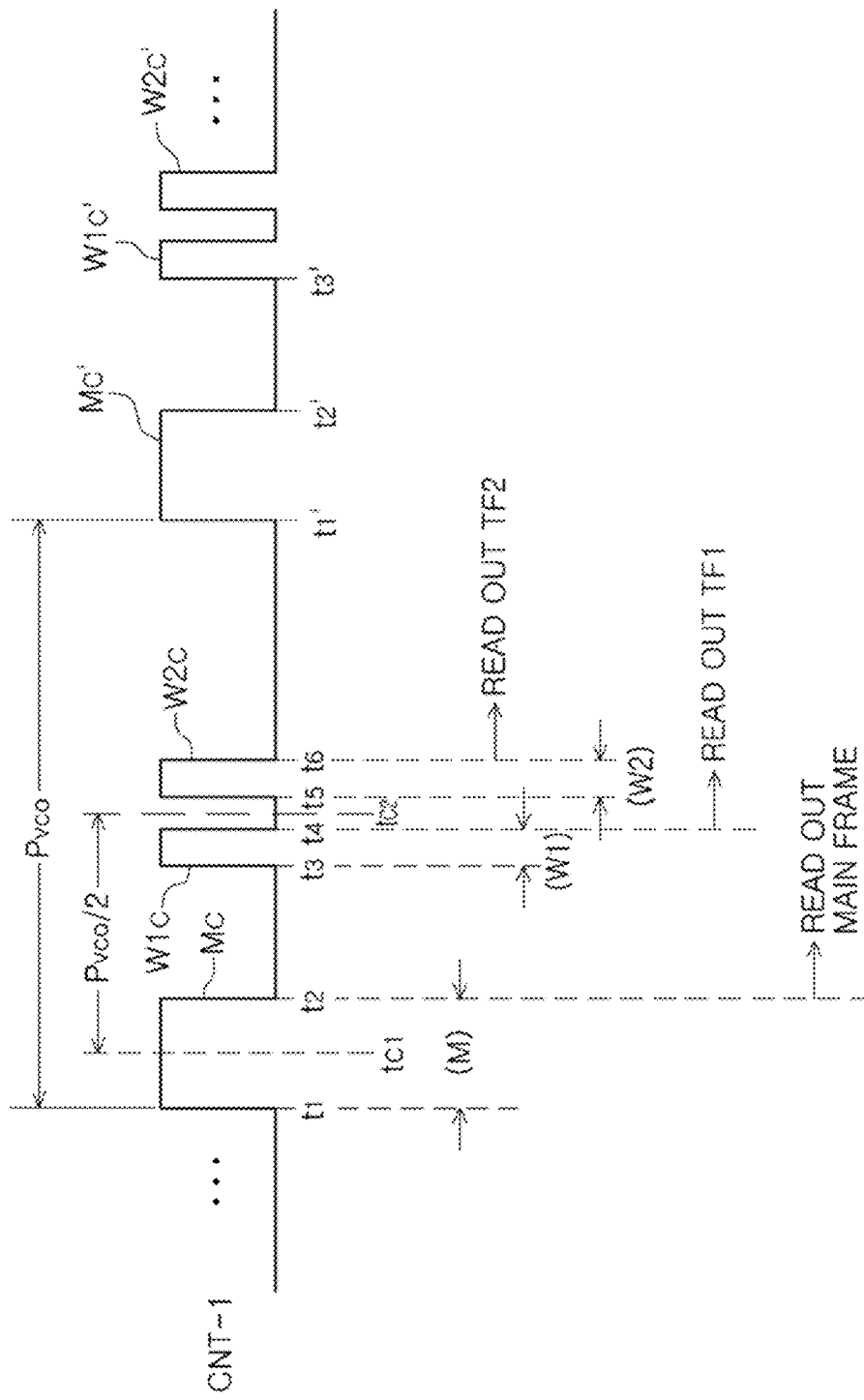
FIG. 5 depicts example control pulses of a shutter control signal that may be generated within a camera according to an embodiment.

FIG. 4 is a flow diagram illustrating an example process by which ISP 320 may read data from image sensor 310 and generate output signals. This process may correspond to operations during one exposure window cycle encompassing one main exposure window M and a pair of test exposure windows W1, W2. FIG. 5 shows example control pulses within shutter control signal CNT-1 applied to image sensor 310. In the examples of FIGS. 4 and 5, an exposure window cycle (coinciding with a control pulse cycle) is described as having a main frame preceding a pair of test frames; however, in other examples, the test frames may precede the main frame in any given cycle.

Referring collectively to FIGS. 2-5, one cycle of control pulses within control signal CNT-1 may include a main control pulse Mc and first and second test frame (TF) control pulses W1c, W2c. Main control pulse Mc extends from time t1 to t2, and causes the image sensor 310 shutter to open during this time (generating an exposure window M). TF control pulses W1c, W2c extend between times (t3-t4) and (t5-t6), respectively and generate exposure windows W1, W2 during corresponding time periods. TF control pulses W1c, W2c (and test exposure windows W1, W2) may have equal widths, which facilitates subsequent comparison processing of the test frames. The width (t1-t2) of control pulse Mc, which may equal that of window M, may be set automatically according to a particular application, lighting conditions, or may be set manually. Window M is typically longer than W1 or W2. A next exposure period cycle may begin at time t1' at which a next control pulse Mc' starts. A period $P_{VCO}$ (equaling $1/f_{VCO}$) may be a time duration between times t1 and t1' (and may equal a time duration between times t3 and t3'). A time period $P_{VCO}/2$ may be set between a central time point $t_{C1}$ of main control pulse Mc and a central time point $t_{C2}$ midway between pulses W1c, W2c.

As shown in FIGS. 4 and 5, during one exposure window cycle, ISP 320 may read out (S402) data of a main frame at the end of a main window M, beginning at time 2. This data may be processed and provided as output data DS. At the end of the next exposure window W1 (at time t4), ISP 320 may read out (S404) luminance data of a first test frame TF1 taken during window W1. This luminance data (e.g., K luminance values for K respective pixels of image sensor 310) may then be averaged over the test frame (S406) to obtain an average luminance p1 of the captured scene during the exposure window of test frame TF1. The averaging may be done over all the pixels of the frame, or alternatively over just a predetermined region of the frame. Next, data from a second test frame TF2 taken during exposure window W2 may be read out at time t6 (S408) and an average luminance p2 for test frame TF2 may be determined in the same way (S410). A difference in luminance (p1-p2) may then be determined, and a difference signal S1=(p1-p2) may be output (S412) to loop filter 340. It is noted here that for the test frames TF1, TF2, instead of reading out K luminance values for K respective pixels of image sensor 310, any of a number of techniques may be alternatively used to reduce the amount of data and attendant power consumption. Some examples include analog-binning and/or cropping of the test frames.

Signal S1 may be akin to a phase detector output signal of a phase lock loop (PLL). A phase detector typically produces a series of output pulses, each having a width or peak level proportional to an instantaneous phase shift between two input signals. The difference signal S1 may also be a series of output pulses, where each pulse may have a width and/or peak level proportional to (p1-p2) in the exposure window cycle just measured. Over the course of multiple exposure window cycles, a resulting pulse train of "(p1-p2) pulses" may have an average voltage $V_{AVG}$ over a unit of time. Loop filter 340 may smooth out the pulse train into a proportional DC voltage (M $kV_{AVG}$, where k is a proportionality constant) and output the same as a loop filter output signal LFo, which is applied as an input to VCO 350.

If (p1-p2) is not exactly zero, the corresponding pair of test frame windows W1, W2 may not be perfectly aligned with a null Nu of the ambient light waveform $L_{SC}$. Due to noise in the measurement data, even if the windows W1, W2 are perfectly aligned, the measurement for (p1-p2) may give a non-zero result. In this case, the average voltage $kV_{AVG}$ reflected in signal LFo may be high enough to cause VCO 350 to correspondingly increase or decrease the frequency $f_{VCO}$ of its output signal CLK. The change in frequency $f_{VCO}$ is in turn applied to the next exposure window cycle, increasing or decreasing the period $P_{VCO}=1/f_{VCO}$ (see FIG. 5). This adjustment may delay or advance the timing of the next pair of test windows W1c', W2c' towards a point closer to a null Nu of the ambient light waveform $L_{SC}$. With this PLL-type feedback scheme, the VCO 350 output frequency $f_{VCO}$ may converge over a number of cycles to equal the flicker frequency $f_{FL}=1/FP$ of the ambient light source. When convergence is reached, the VCO 350 output frequency $f_{VCO}$ may be locked to the flicker frequency $f_{FL}$. Subsequent test frame windows W1, W2 may then be substantially aligned with nulls Nu, while subsequent main frame windows M may be aligned with peaks $P_K$. Nevertheless, due to noise in the measurements and the possibility of flicker frequency drift, the test frames may continue to be measured and the VCO 350 may continue to make adjustments. In some embodiments, discussed below, after an approximate alignment is achieved, a low power mode may be initiated, in which the test frames are measured at a lower frequency (e.g., <½, <¹⁄₁₀, or even <¹⁄₁₀₀ of the frequency $f_{VCO}$ used to achieve the initial alignment).

Figure 6:
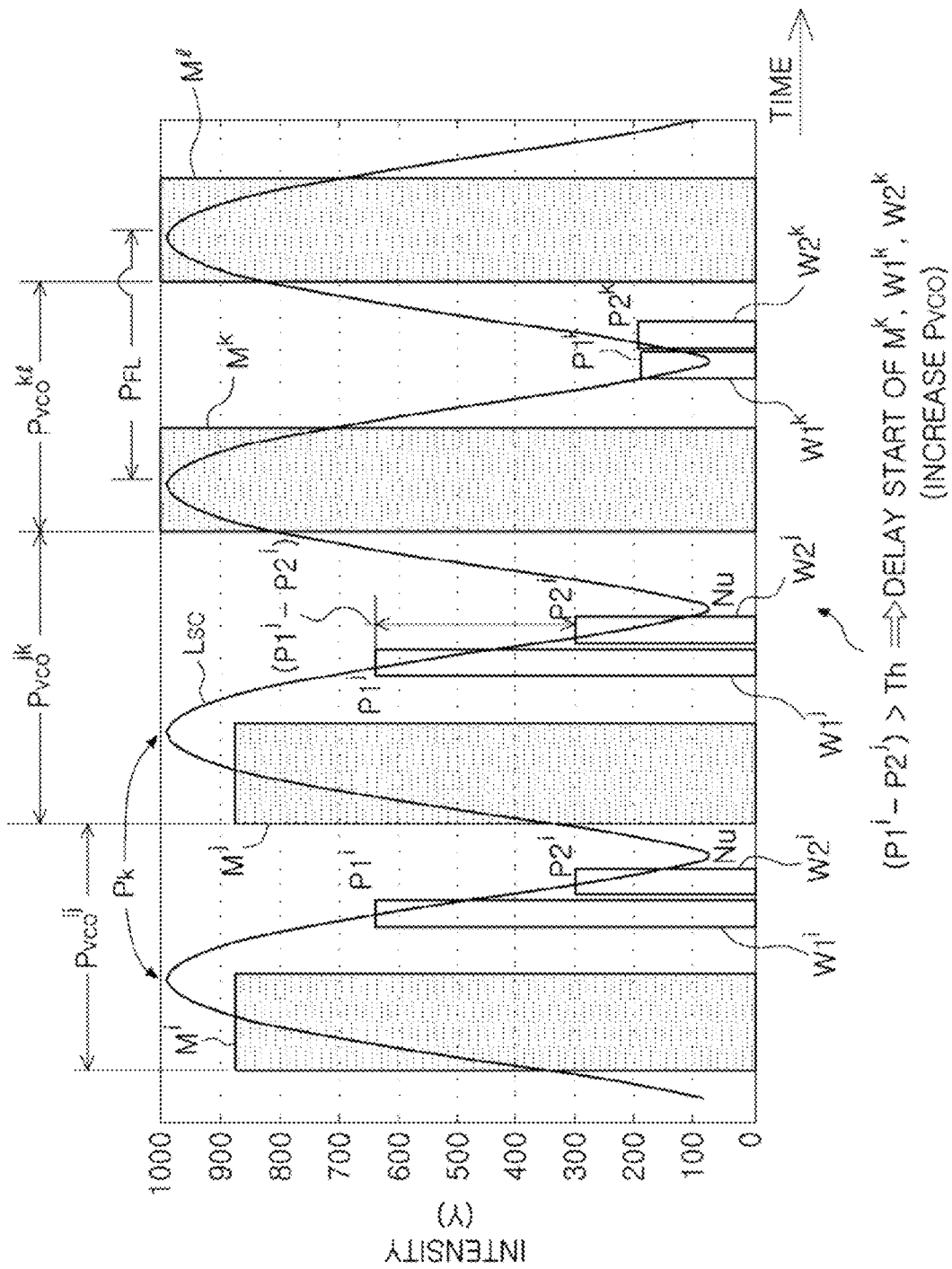
FIG. 6 graphically illustrates an example of an exposure window timing adjustment process that may occur in a camera according to an embodiment.

FIG. 6 graphically illustrates a simplified example of the exposure window timing adjustment process that may occur in camera 300, to facilitate an understanding of concepts taught herein. An $i^{th}$ exposure window cycle may include an $i^{th}$ main window $M^i$ and an $i^{th}$ pair of test windows $W1^i$, $W2^i$, over which average luminance levels $p1^i$, $p2^i$ are measured. During this time, the test windows $W1^i$, $W2^i$ are misaligned with the nulls Nu, and the main window $M^i$ is misaligned with the peaks $P_K$ of the flicker waveform. A $j^{th}$ exposure window cycle may include a $j^{th}$ main window $M^j$ and a $j^{th}$ pair of test windows $W1^j$, $W2^j$. According to the current CLK signal output by VCO 350, the period between main windows $M^i$ and $M^j$ may be $P_{VCO}^{ij}$. (The periods between successive pairs of test windows may be the same as those between successive main windows.)

Although the difference ($p1^i-p2^i$) may be large, the VCO 350 output frequency $f_{VCO}$ may not change immediately because it may take several exposure cycles for the loop filter output signal LFo to reflect this condition. (Signal LFo may have an instantaneous value proportional to an average voltage over a number of recent cycles.) Therefore, the period $P_{VCO}^{ij}$ may be the same duration as that of the previous period between main windows M. Thus, the next main window M may still lag the next peak $P_K$ and the next set of test windows $W1^j$, $W2^j$ may still lag the next null Nu.

In the next cycle, ($p1^j-p2^j$) is still large, and the signal LFo reflects this condition in its voltage sufficiently to cause a change in the VCO 350 output frequency $f_{VCO}$. This causes the period $P_{VCO}^{jk}$ to lengthen ($P_{VCO}^{jk}>P_{VCO}^{ij}$), delaying the start of the next main window $M^k$ towards alignment with the next peak $P_K$, and delaying the start of the next set of test windows $W1^k$, $W2^k$ towards alignment with the next null Nu. In the following exposure window cycle (the $k^{th}$ exposure cycle), ($p1^j-p2^j$)≈0, which may not change the next cycle's VCO frequency ($P_{VCO}^{kl}=P_{VCO}^{jk}$), reflecting a phase locked condition, or which may result in only minimal changes in the next and each succeeding cycle due to measurement noise (reflecting a substantially phase locked condition).

In the above-discussed operations of camera 300, a sequence of exposure windows and associated frame captures has been described as alternating between main windows M and pairs of test windows W1, W2. In another embodiment or operating mode, a sequence of multiple pairs of test frames may be captured first, and the timing of the test frames adjusted until they're substantially aligned with (i.e., substantially in phase with) the nulls Nu of the light waveform $L_{SC}$. Once the test frames are substantially in phase with the nulls Nu, one or more main frames may begin to be captured at times midway between the pairs of test frames (offset from the pairs of test frames by FP/2).

As noted earlier, in the case of continuous recording of video, the main frames need not be captured during every flicker cycle, but may instead be captured at intervals that periodically skip one or more flicker cycles. In this case, the main frames may be captured at a period of nFP, where n is an integer of 2 or more and FP is the flicker period. Camera 300 may also include a frame rate converter (not shown) to convert the main frames, using an interpolation algorithm, to a sequence of frames displayable at a target display rate.

In the above examples, pairs of test frames TF1, TF2 are captured in corresponding windows W1, W2 to sample the ambient light and track its flicker waveform. Each pair of test frames TF1, TF2 taken over a given exposure window cycle is an example of a set of test frames. In other embodiments, a set of n test frames may comprise three or more test frames. Moreover, the number of test frames within each set of test frames may be varied, depending on the stage of flicker tracking. For instance, sets of three or more test frames may be initially used for a predetermined number of cycles as part of an initialization routine. Thereafter, test frames may be captured in pairs. This technique may be used to prevent a situation in which pairs of test frames might become "stuck" at the peaks $P_K$ of the flicker waveform.

Figure 7A:
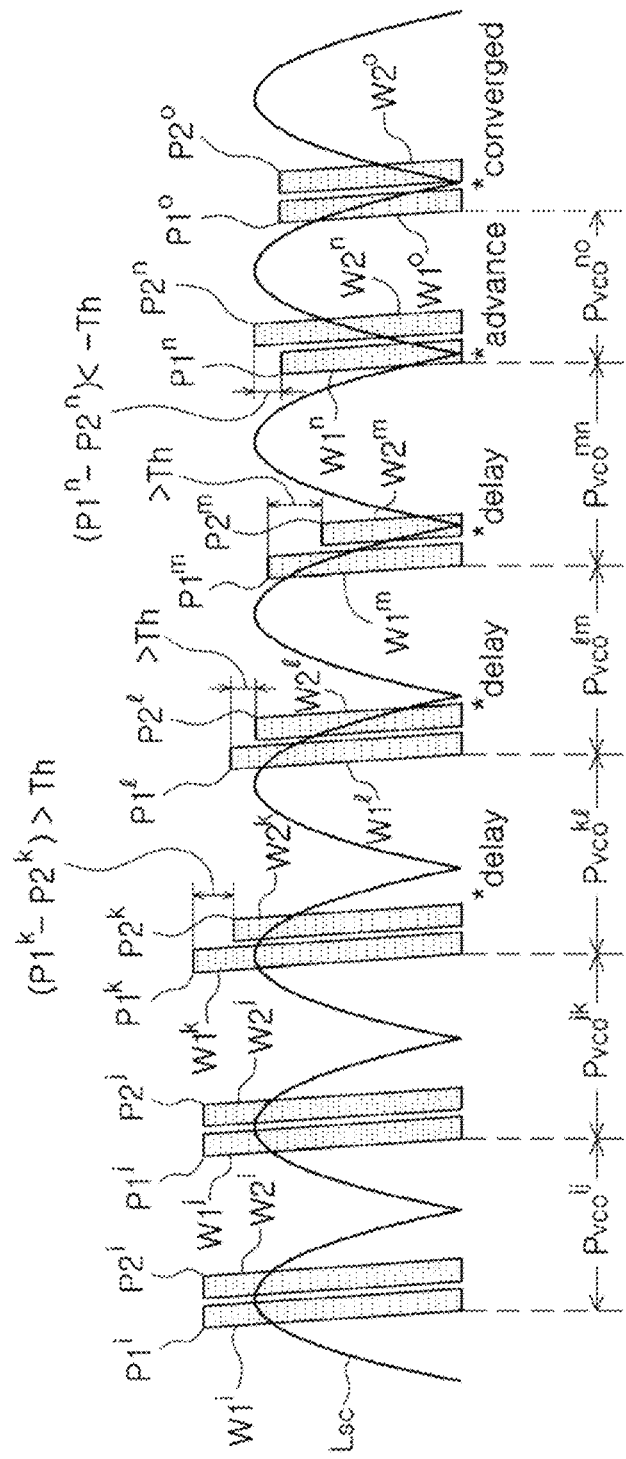
FIGS. 7A and 7B show respective examples of test exposure window timing adjustment when test exposure windows are initially aligned with peaks of a flickering light waveform.

FIG. 7A illustrates an example of timing adjustment by camera 300 when test exposure windows are initially aligned with peaks of the flickering light waveform $L_{SC}$. In general, flicker tracking may be initiated in camera 300 by first setting the VCO 350 output frequency $f_{VCO}$ to an approximate flicker frequency $f_{FL}$ of an expected flicker, e.g., 100 Hz for 50 Hz AC power or 120 Hz for 60 Hz AC power for the lighting. (The initial setting may be a default setting or a setting based on user input, and may be set by means of ISP 320 and/or controller 330 sending a command signal to VCO 350.) However, an instantaneous phase of the light waveform $L_{SC}$ at the time a flicker tracking operation begins may be unknown. Therefore, as seen in FIG. 7A, it may be possible for an initial pair of test exposure windows $W1^i$, $W2^i$ to occur at a peak of the waveform $L_{SC}$. This may result in the measured average luminance levels $p1^i$, $p2^i$ for the corresponding test frames $TF1^i$, $TF2^i$ to be nearly equal, and the difference less than a threshold Th ($p1^i-p2^i<Th$), where the threshold Th may be set to exactly zero, or may be alternatively set to a positive value. Hence, the PLL scheme of camera 300 may not make an adjustment in $f_{VCO}$ at this point based on the difference ($p1^i-p2^i$), or may make only a minimal adjustment.

However, since the initial setting of $f_{VCO}$ is only an approximation of $f_{FL}$, after a number of flicker cycles the test windows W1, W2 may begin to drift off the peaks. For instance, as shown in FIG. 7A, if an initial test frame cycle period $P_{VCO}^{ij}$ is slightly more than the flicker period FP (the initial $f_{VCO}$ is slightly less than the actual $f_{FL}$), after a number of cycles subsequent test windows may coincide with a downward sloping portion of the waveform $L_{SC}$. As illustrated, test windows $W1^k$, $W2^k$ a few cycles later may occur on a downward sloping portion of $L_{SC}$, resulting in $(p1^k-p2^k)>Th$. This triggers a change in $f_{VCO}$ (a decrement), delaying the start of the next set of test windows $W1_i$, $W2^i$ from a time point where they would otherwise begin based on the prior value for $f_{VCO}$. In other words, a phase delay is inserted to move the next test windows $W1^i$, $W2^i$ towards a null Nu. For example, $P_{VCO}{}^{jk}=P_{VCO}{}^{ij}$, but for the next cycle, $P_{VCO}{}^{kl}>P_{VCO}{}^{jk}$. The incremental adjustment process may continue until the test windows converge at a null Nu. If an overshoot occurs, the window timing may be moved in the other direction. For instance, it is seen in the nth cycle that $(p1^n-p2^n)<\sim Th$, which causes $f_{VCO}$ to increase and the test windows' phase to advance in the next cycle $(P_{VCO}{}^{no}<P_{VCO}{}^{mn})$.

Figure 7B:
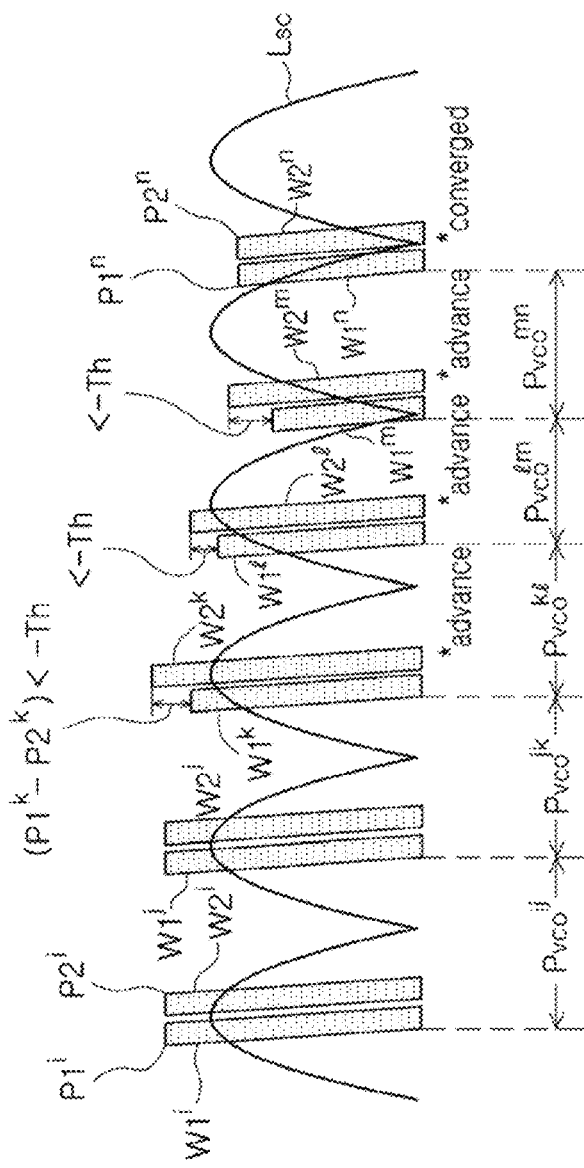

FIG. 7B illustrates a similar example where the initial test windows $W1^i$, $W2_i$ occur at a peak of the waveform $L_{SC}$, but the initial period $P_{VCO}{}^{ij}$ is shorter than the actual flicker period FP. This causes the next few pairs of test windows to coincide with a portion of the rising half of the waveform $L_{SC}$. When movement is significant enough, the difference in average luminance levels between test frames of a pair exceeds the threshold (e.g. $(p1^k-p2^k)<-Th$), triggering a sequence of phase advances. When the test frames' phase reaches a point at which the test frame pairs TF1, TF2 have approximately equal average luminance, convergence is reached. In the example of FIG. 7B, convergence is reached at the point when $(abs(p1''-p2'')<Th)$ (or when $abs(p1''-p2'')=0$ for the case of Th=0).

Accordingly, FIGS. 7A and 7B illustrate conditions in which a pair of test frames with maximum average luminance (a "maximum pair") have an unstable phase. With the phase locked loop (PLL) based convergence mechanism, the PLL converges to the "lowest pair" of test frames, which has a stable phase. Thereby, the optimal frame rate and the optimal phase for image capture in the flickering environment are "learned" by the PLL.

In an alternative embodiment, rather than setting the initial frequency $f_{VCO}$ to a close approximation of $f_{FL}$, the frequency $f_{VCO}$ is deliberately set slightly different from an approximation of $f_{FL}$. Because this approach ensures that the initial period $P_{VCO}$ between sets of test frames will differ from $f_{FL}$, this will force the PLL to converge to the correct points of the waveform $L_{SC}$ without a risk of becoming "stuck" at the peaks.

In still another embodiment, an initiation routine begins with more than two samples of test frames (a set of initial test frames is three or more). The luminance from the three or more test frames is then compared to each other to determine whether the initial samples are at the peak. If the initial samples are at the peak, the signal S1 may be output at a level sufficient to initiate a corresponding delay or advance to move the samples off the peak in the next exposure window cycle. After a number of cycles, each test frame cycle may be implemented with pairs of test frames rather than in sets of three or more test frames.

It should also be noted that without a mechanism to prevent incorrect stable points, another incorrect stable point (that occurs in a phase locked state) could be twice the flicker frequency (e.g. 200 Hz or 240 Hz). That is, if the VCO frequency $f_{VCO}$ were to continually adjust higher, based on the (p1-p2) measurements, to $2f_{FL}$, a first pair of test frame windows $W1^i$, $W2^i$ could be aligned with a null Nu, and the next pair of test frames $W1^j$, $W2^j$ could be aligned with the adjacent peak $P_K$, which is an undesirable result. In another scenario, the adjustment of $f_{VCO}$ could result in it becoming too low, resulting in a first pair of test frame windows $W1^j$, $W2^i$ being aligned with a null Nu and the next set of test frame windows $W1^i$, $W2^i$ being aligned with a peak 1.5 flicker periods away. To prevent these sorts in incorrect stable points, VCO 350 may be controlled via logic circuitry or programming to restrict its output frequency $f_{VCO}$ to fall within the range of +/-X % (e.g. +/-5% or higher) of the possible (estimated) flicker frequency $f_F$ in the environment, where X may be a preset value. For instance, if X %=5%, $f_{VCO}$ may be restricted to fall within a range of 95-105 Hz for 100 Hz flicker, or 114-126 Hz for 120 Hz flicker.

Figure 8:
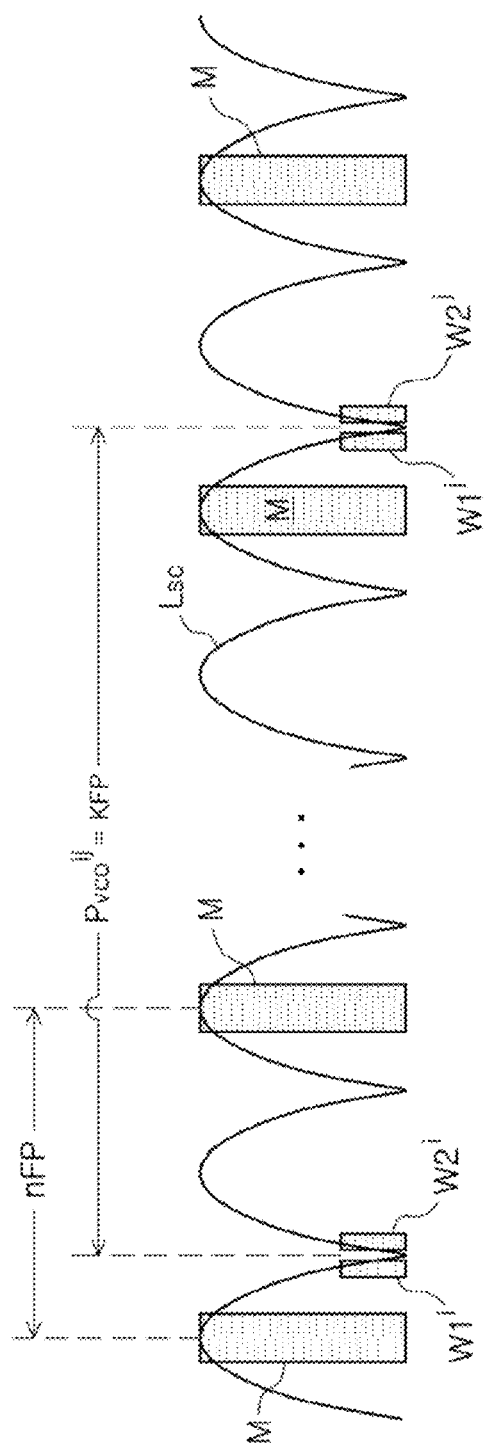
FIG. 8 is a timing diagram illustrating an example operation of camera 300 in a low power mode for flicker tracking and exposure window timing adjustment.

FIG. 8 is a timing diagram illustrating an example operation of camera 300 in a low power mode for flicker tracking and exposure window timing adjustment. In a low power mode, instead of capturing a set of test frames during every flicker period FP, a set of test frames is captured only once over several (at least two) or tens of flicker periods FP, thereby consuming less processing power. For example, FIG. 8 shows that a period $P_{VCO}{}^{ij}$ between a first set of test windows ($W1^i$, $W2^i$) to a succeeding set of test windows ($W1^j$, $W2^j$) is (K×FP), where K may be set in a number of different ways. FIG. 8 also illustrates that for continuous recording of video, main frames may be captured at a frame rate that is an integer number "n" of flicker periods FP, where n may be two or more. Thus, shutter controller 330 may modify shutter control signal CNT-1 by including pulses Mc at a first rate (1/nFP), interspersed with test window pulses (W1c, W2c) at a second, slower rate (1/KFP).

For instance, a flicker frequency may be expected to wander slowly, e.g. by a small percentage over a period of seconds. It may therefore be feasible to capture the test frames at rate that is one or two orders of magnitude slower than the main frame capture rate. Thus, in FIG. 8, while the number n for the main frames may be in the range of (one to several), K may be a predetermined number in the range of, e.g., (10 to 100) or (10-200). Note that the low power mode may be initiated after an initial flicker tracking period with a higher rate of test frames, e.g., with K in the range of (1-10). In this case, once the initial flicker tracking results in a convergence of the higher rate test frames to track the flicker waveform nulls Nu as described above, ISP 320 may initiate the low power mode in conjunction with shutter controller 330. A convergence may be identified by |p1−p2| being ≈zero (or being less than a predefined threshold near zero) for a predetermined number of consecutive test cycles.

In another low power embodiment, the number K of flicker periods between sets of test frames may be updated adaptively. For example, a flicker tracking method may involve the following: if |p1−p2|<Th (or |p1−p2|≈0) for N consecutive samples (each sample=set of test frames), where N is predetermined, increase the number K of flicker periods between samples; otherwise, decrease K.

In any of the above operating modes, including the low power modes, power reduction may additionally or alternatively by realized by using analog-binning, cropping or any other suitable technique that trades off accuracy for power.

Figure 9A:
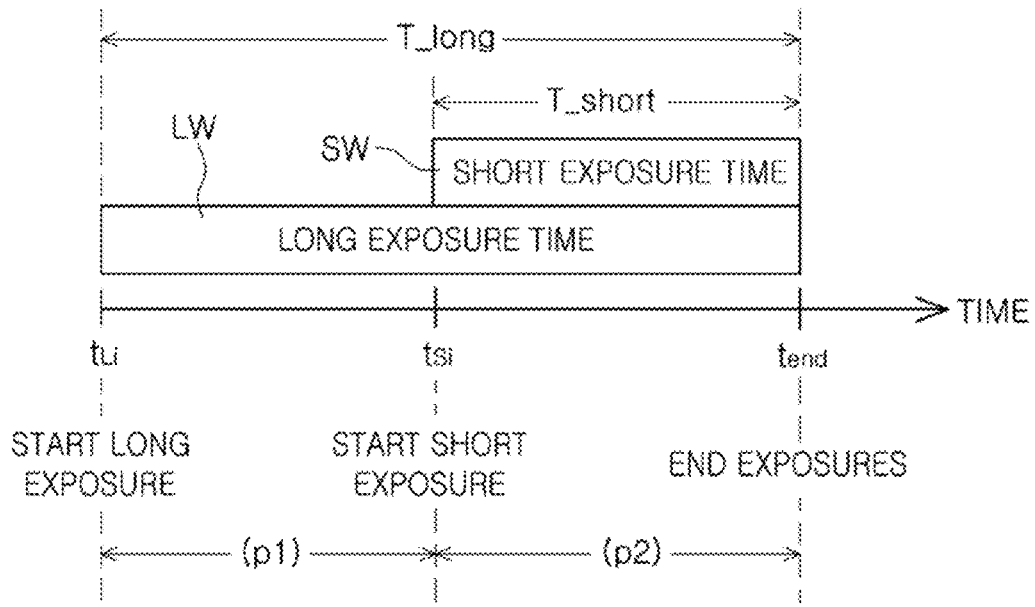
FIG. 9A is a timing diagram illustrating a first example of HDR exposure timing according to an embodiment.

FIG. 9A is a timing diagram illustrating a first example of HDR exposure timing that may be implemented in embodiments of the inventive concept. As mentioned earlier in connection with FIG. 3, image sensor 310 may be embodied as an HDR-capable sensor. In this case, two or more exposures of different durations may be captured in exposure windows that overlap in time. Normally, this technique is used to create an image with a high dynamic range (an HDR image). As may be done in a conventional HDR sensor, different exposure windows are allocated for different pixels located in a common local region on image sensor 310. This technique may be leveraged according to embodiments herein to allow for the test frame average luminance values ("samples") p1 and p2 to be obtained based on the difference in luminance values measured for the respective HDR exposures. In the following discussion, a "multi-exposure test frame" may be comprised of a long test frame plus a short test frame. A multi-exposure test frame may be understood to correspond to the first and second test frames TF1, TF2 described in the above embodiments.

For example, as shown in FIG. 9A, instead of utilizing pairs of test frame exposure windows W1, W2 separated in time, a pair of HDR test frame windows may overlap one another. A long exposure test window LW may begin at time $t_{Li}$ and end at a time $t_{end}$ and thus have a length T_long= $(t_{end}-t_{Li})$. A short exposure test window SW may overlap window LW by beginning at time $t_{Si}$ following $t_{Li}$ and ending at the same end time $t_{end}$, and may thus have a length T_short=$(t_{end}-t_{Si})$. Readout of both test windows LW and SW may begin at time $t_{end}$ as in a typical HDR sensor. For the purpose of capturing the two samples P1 and P2, instead of taking two separate samples as described in connection with FIGS. 4-8, a single multi-exposure sample may be taken, and the values of p1 and p2 may be derived by ISP 320 from the multi-exposure sample.

In the example of FIG. 9A with two exposures, exposure time T_long may be set as, T_long=2*T_short.

The luminance values of the pixels involved in each respective exposure may then be summed. The luminance values for pixels associated with the long exposure window LW may be summed to obtain a value p_long. The luminance values for pixels associated with the short exposure window SW may be summed to obtain a value p_short. Two effectively equal exposures may then be derived as:

p1=p_long−p_short, and p2=p_short, where p1 may represent the scene's light intensity captured between times tLi and tSi, and p2 may represent the scene's light intensity captured between times tSi and $t_{end}$. The values p1 and p2 may be then be used by ISP 320 in the manner described above for FIG. 3 to synchronize the main frames M with the peaks $P_K$ of the flicker waveform (e.g., ISP 320 may determine (p1−p2) for each test frame and output the signal S1 containing pulses representing (p1−p2) to loop filter 340, etc.). Note that the main frames M may be captured as multi-exposure HDR frames, or alternatively as traditional image frames, with suitable control of image sensor 310 and processing by ISP 320.

Figure 10:
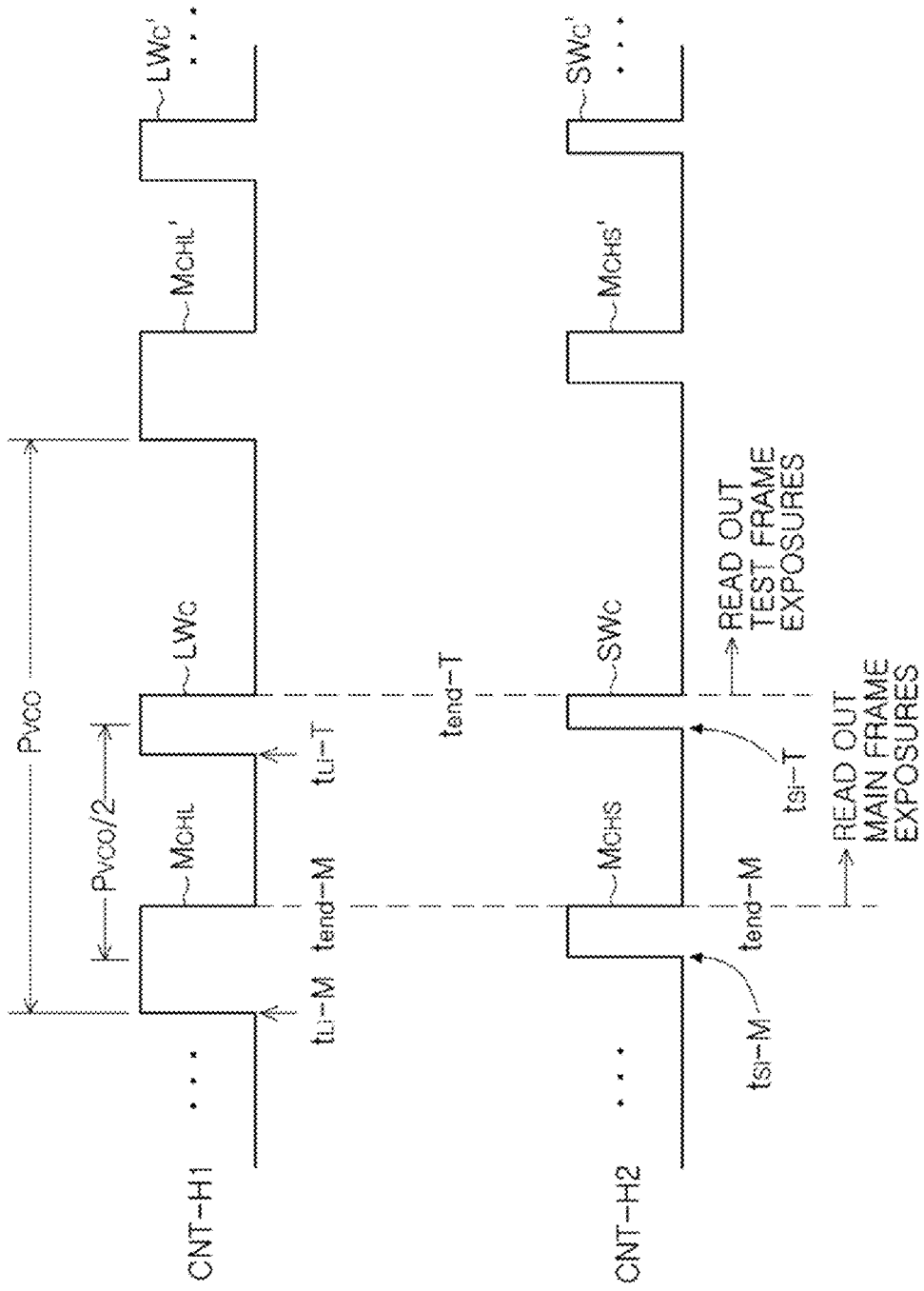
FIG. 10 is a timing diagram depicting example control signals that may be applied to an image sensor 310 to implement the HDR exposure windows of FIG. 9A.

FIG. 10 is a timing diagram depicting example control signals CNT-H1, CNT-H2 that may be applied to image sensor 310 to control the same to implement the HDR exposure windows of FIG. 9A. These signals, generated by shutter controller 330, are merely exemplary, since the type of control signals to generate the desired exposure windows may depend on the particular HDR type/configuration of image sensor 310. In any case, the HDR exposure windows LW and SW of FIG. 9A may be provided periodically, and may be interspersed with main exposure windows M. First control signal CNT-H1 may control long exposure window timing of both the main frames M and the test frames TF. In a given cycle with one main frame and one pair of test frames (one long exposure frame, one short exposure frame), a main window control pulse $M_{CHL}$ may begin at a time $t_{Li}$-M and end at a time $t_{end}$-M. This control pulse $M_{CHL}$ may cause image sensor 310 to output a main long exposure frame M-long captured during the time of the control pulse $M_{CHL}$. A test window control pulse LWc may begin at time tLi-T and end at time tend-T. This control pulse LWc may cause image sensor 310 to output a long exposure test frame captured during the time of the control pulse LWc.

Similarly, second control signal CNT-H2 may control short exposure window timing of both the main frames M and the test frames TF. In a given main/test frame cycle, a main window control pulse $M_{CHS}$ may begin at a time $t_{Si}$-M (e.g. midway between times $t_{Li}$-M and $t_{end}$-M) and end at a time $t_{end}$-M. This control pulse $M_{CHS}$ may cause image sensor 310 to output a main short exposure frame M-short captured during the time of the control pulse $M_{CHS}$. A test window control pulse SWc may begin at time $t_{Si}$-T and end at time $t_{end}$-T. This control pulse SWc may cause image sensor 310 to output a short exposure test frame captured during the time of the control pulse SWc. Note that readout of both the long and short main exposure windows may begin at time $t_{end}$-M, and readout of both the long and short test exposure windows may begin at time $t_{end}$-T.

Similar to the embodiment described above for FIG. 5, the period $P_{VCO}$ may be a period between corresponding edges of control pulse $M_{CHL}$ and the next control pulse $M_{CHL}'$ in the next main/test frame cycle, and a duration $P_{VCO}/2$ may separate midpoints of control pulses $M_{CHL}$ and LWc.

Figure 9B:
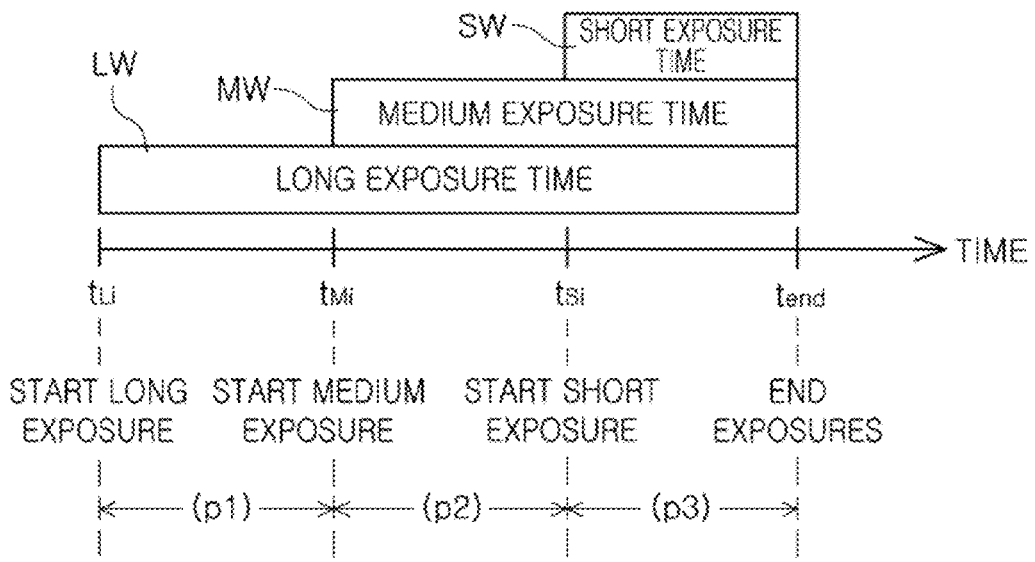
FIG. 9B is a timing diagram illustrating a second example of HDR exposure timing according to an embodiment.

FIG. 9B is a timing diagram illustrating a second example of HDR exposure timing that may be implemented in embodiments of the inventive concept. This embodiment utilizes three HDR exposure windows: a long window LW, a medium window MW, and a short window SW, beginning at times $t_{Li}$, $t_{Mi}$ and $t_{Si}$, respectively, and each ending at time $t_{end}$. With this embodiment, for a given main/test frame cycle, it is possible to estimate the flicker phase instead of just determining whether the main/test frame lags or leads the flicker phase. This may be accomplished in the three exposure window example of FIG. 9B by setting T_long=3*T_short and T_medium=2*T_short (where Tmedium=$t_{end}-t_{Mi}$; T_short=$t_{end}-t_{Si}$) and calculating the three effective exposures, p1=p_long−p_medium;p2=p_medium−p_short,
p3=p_short, where p1 may represent the scene's light intensity captured between times $t_{Li}$ and $t_{Mi}$; p2 may represent the scene's light intensity captured between times $t_{Li}$ and $t_{Mi}$ $t_{Si}$, and p2 may represent the scene's light intensity captured between times $t_{Si}$ and $t_{end}$.

Using these three values, for the case p1>p2 and p3>p2, the relative location of the null Nu of the intensity waveform $L_{SC}$ (the exact minimum of the signal) relative to the test frames' timing may be estimated. Estimating the relative location of the null may be done with an interpolation involving the values p1, p2 and p3 and the timing of the long, medium and short windows. For example, the interpolation may be a cubic spline interpolation, using p1, p2 and p3, between three reference points of the test windows LW, MW and SW (e.g., the midpoints of the window sections coinciding with p1, p2 and p3). Likewise, if p1<p2 and p2<p3, the signal minimum may be estimated in a similar manner. By using these calculations, the PLL (comprised of VCO 350, etc.) may set a more precise offset to the clock, and exhibit even more exact flicker-phase synchronization. This technique also eliminates the possibility of getting "stuck" at the peak $P_K$ of the flicker phase instead of at the null Nu. It is noted here that any suitable control signals, e.g., similar to those of FIG. 10, may be applied to image sensor 310 to generate the exposure windows of FIG. 9B.

As mentioned earlier, image sensor 310 of camera 300 may operate with a global shutter in which an entire frame of the scene is captured simultaneously. In an alternative embodiment of camera 300, image sensor 310 has a rolling shutter mechanism in which horizontal lines of each frame may be captured non-simultaneously on a rolling basis. The pixel data of the horizontal lines are also read out on a rolling basis.

Figure 11A:
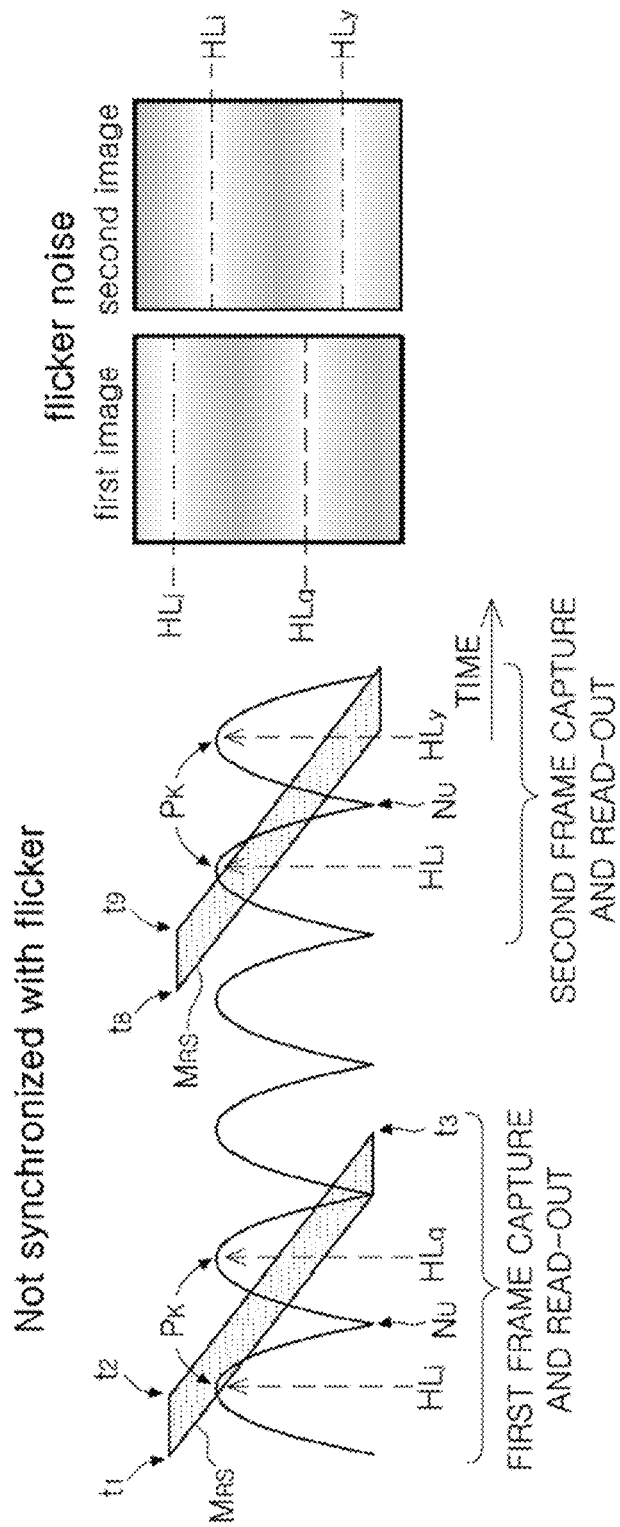
FIG. 11A is a diagram illustrating flicker noise that may occur when a rolling shutter image sensor is used in a conventional camera, in an environment with a flickering light source.

For instance, FIG. 11A is a diagram illustrating flicker noise that may occur when a rolling shutter image sensor is used in a conventional camera, in an environment with a flickering light source. In particular, an example is shown in which exposure windows for frame capture are not synchronized with the flicker frequency. The rhomboids (windows) labeled $M_{RS}$ in FIG. 11A each conceptually represent a window for a rolling shutter exposure and associated readout time period for a single frame. For a first frame, an exposure period for pixels of a first (top) horizontal line may begin at time t1 and end at time t2. (This exposure period may be considered an exposure window portion of the rhomboid $M_{RS}$, e.g., a top slice of the rhomboid.) An exposure period for a second horizontal line begins shortly after time t1 and ends shortly after time t2 (which may be understood as a lower adjacent slice of the rhomboid). Rolling readout of data for the first and subsequent horizontal lines begins at time t2 and ends at approximately time t3, which coincides with the end of an exposure period for a last horizontal line. In this example, the exposure period for the first horizontal line, between times t1 and t2, is prior to a peak $P_K$ of the intensity waveform of the flickering light source. Thus, a first peak $P_K$ coincides with a horizontal line HLj a few lines later, as seen in the first image, and is a region of maximum brightness. As the rolling shutter progresses, a gradual reduction in light intensity due to the flickering light source occurs, such that horizontal lines gradually become darker (and darkest when a null Nu is reached) and thereafter gradually become brighter. A succeeding peak $P_K$ is seen to coincide with a horizontal line HLq closer to the bottom of the first frame.

A second frame begins at time t8 which is a time lagging the next peak $P_K$ by a larger time offset than that for the first frame. An exposure period for a first horizontal line ends at time t9 well before the next peak PK, in contrast with the first frame. As a result, the first horizontal line displaying peak intensity, HLi, is noticeably below the horizontal line HLj. Similarly, the next horizontal line displaying peak intensity, HLy, is noticeably below the horizontal line HLq. This sort of spatial movement of the bright and dark spots of the frames, temporally from frame to frame, produces a visual artifact to the human eye.

Figure 11B:
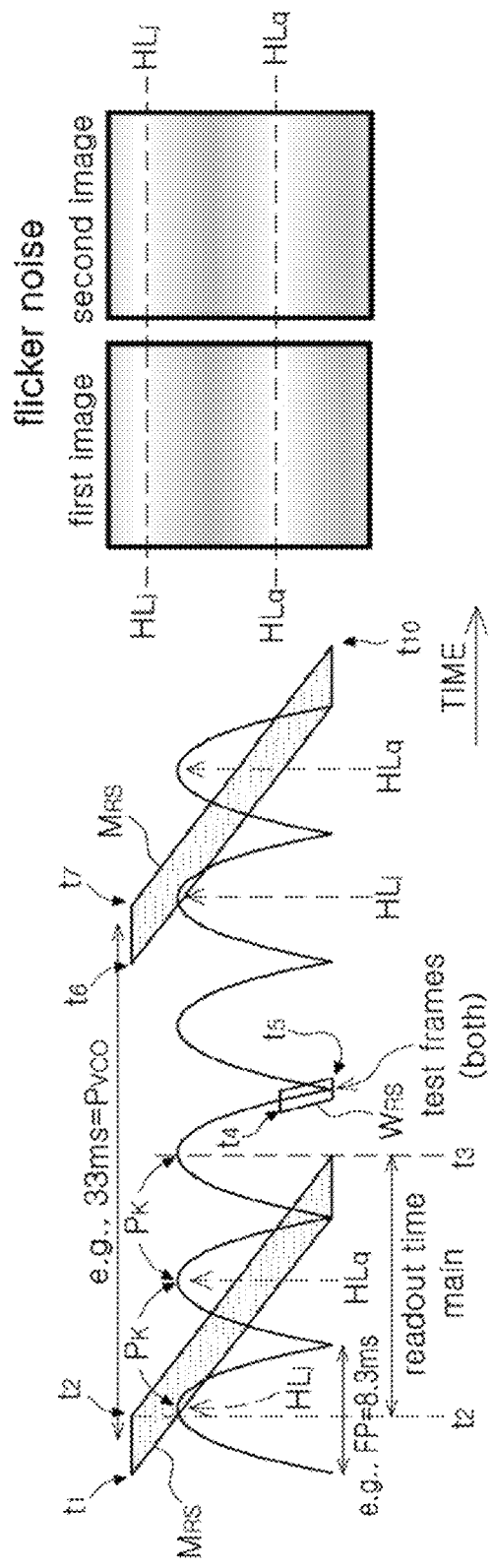
FIG. 11B illustrates an example of frame capture that is synchronized with flicker frequency of an ambient light source, when a rolling shutter image sensor is utilized in a camera accordance with an embodiment.

FIG. 11B illustrates an example of frame capture that is synchronized with flicker frequency of an ambient light source, when a rolling shutter image sensor 310 is utilized in camera 300 accordance with an embodiment of present inventive concept. FIG. 11B thus illustrates a rolling shutter-based embodiment of a method of the present inventive concept. The mechanism for a first main frame capture via a window $M_RS$ between times t1 and t3 may be the same as that described above for FIG. 11A and produces the same first image as seen on the right hand side of FIG. 11B. Subsequently, at least a pair of test frame windows, or a multi-frame test frame window, $W_{RS}$, begins at time t4 and ends at time t5. In the example, the time interval t4-t5 is approximately symmetric about a null Nu, representing a converged (phase locked) condition. In a converged condition, the test frames may be mid-way between main frames, as described in the examples above. Accordingly, the next main frame exposure window may begin at time t6 and end at time t10. An exposure period of the first horizontal line may end at time t7, which lags the next peak PK by about the same time offset as in the first frame. Accordingly, as seen in the second image on the right hand side, first and second maximum brightness horizontal lines HLj and HLq are the same positions as those in the first frame. As a result, instead of producing a vertically moving flickering artifact as in FIG. 11A, the artifact is static with time, i.e. fixed pattern noise, thus appearing less disturbing to the eye. It is noted here that any suitable control signals may be applied by shutter controller 330 to image sensor 310 to implement the exposure windows of FIG. 11B. Control signals similar to those in FIG. 5 or FIG. 10 may be considered.

The method of FIG. 11B may be practical as long as the sum of the readout times of the main image plus the samples (test frames captured over the window WRS) is less than (1/desired frame-rate). This condition will enable sufficient data to be read out for both the main frames and the test frames. For example, in FIG. 11B, the flicker period FP measured between adjacent nulls or peaks is exemplified as 8.3 ms (corresponding to 120 Hz) whereas the frame period PVCO between adjacent main frame windows is exemplified as ~33 ms (30 frames/sec); and the readout time is ~17 ms. To ensure adequate time for capture and readout of the samples, the readout time of the samples can be lower than the readout time of the full image. For example, the readout time of the samples may be reduced by techniques such as analog-binning (grouping pixels to reduce the amount of readout data), or by reading out only a portion of the test-image (cropping) or any other suitable means of trading off accuracy for readout speed.

Figure 12:
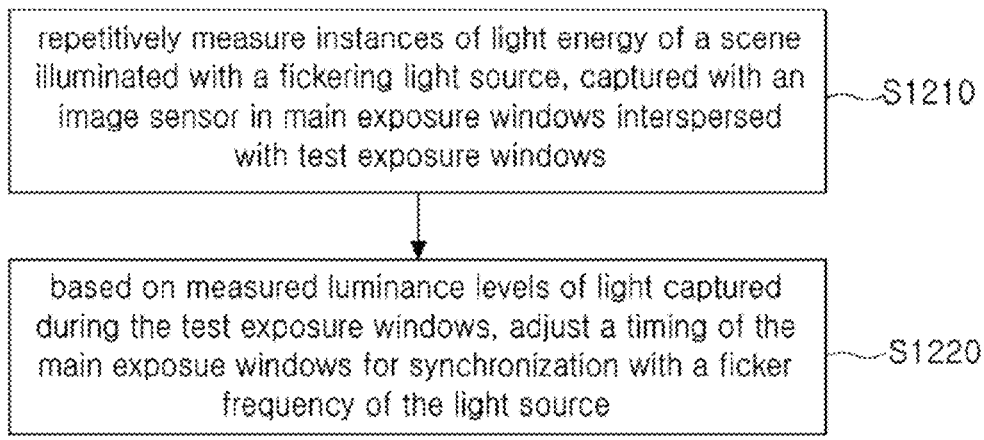
FIG. 12 is a flow diagram of a general method for image capture by a camera in accordance with embodiments of the inventive concept.

FIG. 12 is a flow diagram of a general method for image capture by camera 300 in accordance with embodiments of the inventive concept. The method may be performed by the above-described circuitry of camera 300. Operation S1210 involves repetitively capturing instances of light energy of a scene with an image sensor (310) in main exposure windows (M) interspersed with test exposure windows (e.g. W1, W2, LW, MW, SW described above). Based on luminance levels (p1, p2) of light captured during the test exposure windows, a timing of the main exposure windows is adjusted for synchronization with a flicker frequency ($f_{FL}$) of the light source (operation S1220).

Figure 13:
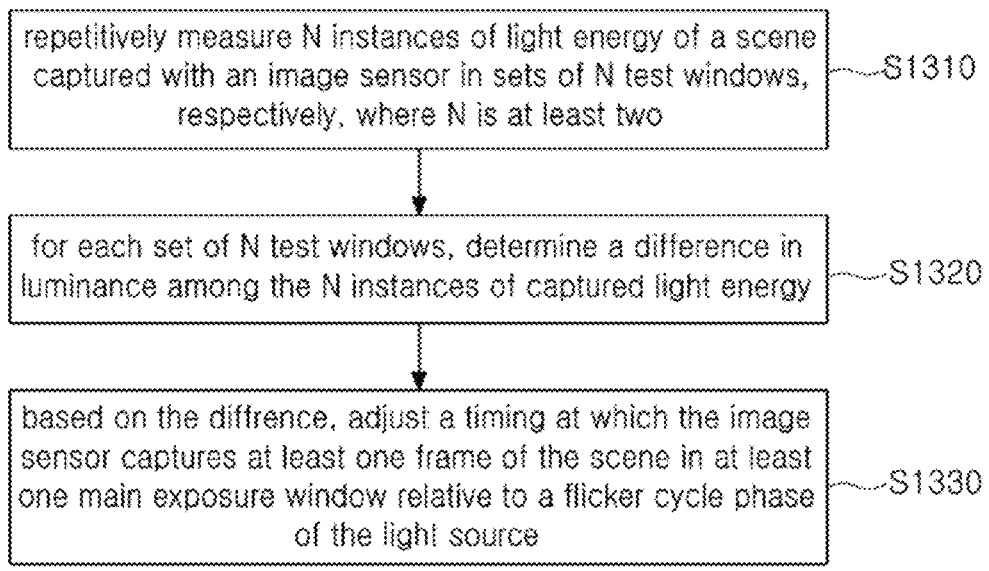
FIG. 13 is a flow diagram of another general method for image capture by a camera in accordance with embodiments of the inventive concept.

FIG. 13 is a flow diagram of another general method for image capture by camera 300 in accordance with embodiments of the inventive concept. In operation S1310, N instances of light energy of a scene are repetitively captured with an image sensor in sets of N test windows, respectively, where N is at least two. For each set of N test windows, the method determines (S1320) a difference in luminance among the N instances of captured light energy. Based on the difference, the method adjusts (S1330) a timing at which the image sensor captures at least one frame of the scene in at least one main exposure window relative to a flicker cycle phase of the light source. For instance, if a peak $P_K$ of a flicker cycle is considered to have a phase of $\pi$, the timing of a main frame exposure window M is incrementally adjusted until the midpoint of the window M is substantially aligned with a peak $P_K$, so that the phase of the window M converges to $\pi$.

In accordance with embodiments of the inventive concept as described above, the same image sensor that captures the main image is utilized to capture test frames for flicker tracking and synchronization, as opposed to using a secondary imaging device for this purpose. Further, a closed PLL type loop may be used in order to synchronize the shutter timing (exposure window timing) with the flicker phase, as opposed to tracking it using a constant framerate as attempted in a conventional approach. Additionally, in some embodiments, flicker phase may be tracked using only a pair of synchronization frames with minimal ISP processing (e.g. determining the difference between average luminance values p1 and p2), and in some cases with a generally long time (up to several seconds) between successive pairs of test frames. Hence the additional power consumption needed for flicker tracking is low.

Embodiments of the inventive concept may minimize flickering artifacts in various applications such as video capture of fast movements in a flickering environment, e.g. indoor sports where the exposure time should be short (less than one flicker period) because of fast motion in the scene. Once the flickering waveform is tracked and main frames aligned with a consistent portion of the flickering waveform from frame to frame (e.g. the peaks of the waveform), no flickering artifacts are visible. Further, optimal timing of imaging may be achieved. Benefits may also be apparent in super slow-motion videos, where the video before/after a super-slow part should be taken with the same exposure as in the super-slow part. Embodiments may obtain all the frames before and after the super-slow motion in synchronization with the flicker.

The processing of the methods described above may each be performed using at least one processor within ISP 320 and/or shutter controller 330. The at least one processor may be dedicated hardware circuitry, or, at least one general purpose processor that is converted to a special purpose processor by executing program instructions loaded from memory (e.g. memory 370).

Exemplary embodiments of the inventive concept have been described herein with reference to signal arrows, block diagrams, signal timing diagrams and algorithmic expressions. Each block of the block diagrams, and combinations of blocks in the block diagrams, and operations according to the algorithmic expressions/signal timing diagrams can be implemented by hardware (e.g. hardware circuits of ISP 320 and shutter controller 330) accompanied by computer program instructions. Such computer program instructions may be stored in a non-transitory computer readable medium (e.g. memory 370) that can direct a computer, other programmable data processing apparatus, or other devices to function in a particular manner, such that the computer readable medium is an article of manufacture including instructions which implement the function/act specified in the flowchart and/or block/schematic/signal diagram.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

While the inventive concept described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A camera comprising:
   an image sensor configured to capture and measure light of a scene to be imaged; and
   control circuitry configured to:
   control the image sensor to measure instances of the light captured in main exposure windows interspersed with test exposure windows, wherein timing of the main exposure windows is adjusted based on luminance levels captured during the test exposure windows, for synchronization with a flickering waveform of the light;
   adjust timing of the test exposure windows based on a difference in luminance levels captured between different test exposure windows; and
   adjust the timing of the main exposure windows correspondingly with the adjustment in timing of the test exposure windows, towards alignment with peaks of the flickering waveform.

2. The camera of claim 1, wherein the control circuitry comprises:
   a shutter controller configured to generate a shutter control signal to open and close a shutter of the image sensor electronically or mechanically to control timing of the main exposure windows and the test exposure windows;
   an image signal processor configured to read out luminance data from the image sensor, and output a difference signal indicative of the difference in luminance levels captured between different test exposure windows;
   a voltage controlled oscillator (VCO) configured to generate a clock signal having a frequency based on the difference signal; and
   a loop filter configured to low pass filter the difference signal and provide the low pass filtered difference signal to the VCO;
   wherein the shutter controller generates the shutter control signal based on the clock signal.

3. The camera of claim 2, wherein the VCO and loop filter are comprised of digital circuitry.

4. The camera of claim 1, wherein the image sensor is configured to capture and measure the light using an electronic shutter mechanism.

5. The camera of claim 1, wherein the control circuitry is configured to implement operations of:
   initiating a low power mode for flicker tracking and exposure window timing adjustment, wherein in the low power mode, a period between successive pairs of test exposure windows is set to at least twice as long as an approximated flicker period between successive nulls of the flickering waveform.

6. The camera of claim 5, wherein the control circuitry is configured to initiate the low power mode after a determination that a pair of first and second exposure windows is substantially aligned with a null of the flickering waveform.

7. The camera of claim 6, wherein in the low power mode, the period between successive pairs of test exposure windows is set to at least one order of magnitude longer than a measured flicker period.

8. The camera of claim 5, wherein in the low power mode, an integer number of approximated flicker periods between sets of test frames is updated adaptively.

9. The camera of claim 8, wherein the control circuitry is configured to implement the adaptive updating by:
   if a difference in average luminance between first and second test frames is below a threshold for a predetermined number N of consecutive pairs of test frames, an integer number K of approximated flicker periods between sets of test frames is increased; otherwise, the integer number K is decreased.

10. The camera of claim 1, wherein the control circuitry is configured to control the timing of the main exposure windows and to control a timing of the test exposure windows by:
applying a control signal to the image sensor to periodically open a shutter thereof electronically or mechanically in pairs of first and second test exposure windows to enable respective pairs of first and second test frames to be periodically captured by the image sensor;
for a current pair of first and second test frames, determining a difference in average luminance captured by the image sensor between the first test frame and the second test frame thereof;
delaying or advancing a starting time of a next pair of first and second test exposure windows according to the difference in average luminance;
determining that a subsequent pair of first and second test exposure windows is substantially aligned with a null of a flickering waveform of the light when a difference in average luminance between a respective pair of subsequent first and second test frames thereof is approximately a minimum; and
when the subsequent pair of first and second exposure windows is substantially aligned with the null, setting the timing of the main exposure windows offset from the timing of the subsequent pair of first and second exposure windows to coincide with peaks of the flickering waveform.

11. The camera of claim 10, wherein the control circuitry is further configured to implement operations of:
initiating a low power mode for flicker tracking and exposure window timing adjustment, wherein in the low power mode, a period between successive pairs of test exposure windows is set to at least twice as long as a measured flicker period between successive nulls of the flickering waveform.

12. The camera of claim 1, wherein:
the test exposure windows are implemented in sets of at least two test exposure windows, each set of at least two exposure windows comprising high dynamic range (HDR) test exposure windows;
wherein the HDR test exposure windows comprise at least a long exposure window and a short exposure window overlapping in time.

13. The camera of claim 12, wherein the long exposure window is twice as long as the short exposure window; and
the control circuitry comprises an image signal processor configured to compute a sample luminance level associated with each set of test exposure windows by computing a difference in average luminance level of pixels corresponding to the long exposure window and average luminance level of pixels corresponding to the short exposure window;
wherein subsequent timing of the test exposure windows and the main exposure windows is adjusted based on the sample luminance level, towards synchronization with the flickering waveform of the light.

14. The camera of claim 1, wherein:
the test exposure windows are implemented in sets of at least three test exposure windows, each set of at least three exposure windows comprising high dynamic range (HDR) test exposure windows;
wherein the HDR test exposure windows comprise a long exposure window, a medium exposure window and a short exposure window overlapping in time.

15. The camera of claim 1, wherein the image sensor comprises a global shutter.

16. The camera of claim 1, wherein the image sensor comprises a rolling shutter.

17. The camera of claim 16, wherein the test exposure windows are implemented in sets of at least two test exposure windows, each set of at least two test exposure windows being between at least two main exposure windows.

18. The camera of claim 17, wherein a readout time of each set of test exposure windows is shorter than a readout time of each main exposure window.

19. A method for image capture in an environment of a flickering light source, comprising:
repetitively measuring instances of light energy of a scene captured with an image sensor in main exposure windows interspersed with test exposure windows;
adjusting timing of the test exposure windows based on a difference in luminance levels between different test exposure windows; and
based on the difference in luminance levels between different test exposure windows, adjusting a timing of the main exposure windows correspondingly with the adjustment in timing of the test exposure windows, using a phase-lock-loop adjustment mechanism, for synchronization with a flicker frequency of the light source.

* * * * *